(12) United States Patent
Eriksson

(10) Patent No.: US 8,583,826 B2
(45) Date of Patent: Nov. 12, 2013

(54) METHOD AND ARRANGEMENT FOR DELIVERING ELECTRONIC STATE MESSAGE INFORMATION

(75) Inventor: Anders Eriksson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 38 days.

(21) Appl. No.: 12/515,203

(22) PCT Filed: Nov. 15, 2007

(86) PCT No.: PCT/SE2007/001012
§ 371 (c)(1),
(2), (4) Date: Jan. 27, 2010

(87) PCT Pub. No.: WO2008/060227
PCT Pub. Date: May 22, 2008

(65) Prior Publication Data
US 2010/0146062 A1 Jun. 10, 2010

(30) Foreign Application Priority Data

Nov. 15, 2006 (SE) .................................. 0602445.9

(51) Int. Cl.
*G06F 15/16* (2006.01)
(52) U.S. Cl.
USPC ........ 709/245; 709/206; 370/352; 379/88.12; 455/445
(58) Field of Classification Search
USPC .................. 709/206, 245; 379/88.12; 455/445
See application file for complete search history.

(56) References Cited

U.S. PATENT DOCUMENTS

| 6,337,857 | B1 * | 1/2002 | Booton | 370/352 |
|---|---|---|---|---|
| 7,035,382 | B1 * | 4/2006 | Shin et al. | 379/88.12 |
| 7,680,955 | B2 * | 3/2010 | Huang et al. | 709/245 |
| 2004/0083306 | A1 * | 4/2004 | Gloe | 709/245 |
| 2006/0224681 | A1 * | 10/2006 | Wurster | 709/206 |
| 2007/0072617 | A1 * | 3/2007 | Lewis et al. | 455/445 |
| 2007/0115936 | A1 * | 5/2007 | Newton | 370/352 |

OTHER PUBLICATIONS

Mobile Email Architecture. Draft Version 1.0—Nov. 8, 2005, Open Mobile Alliance OMA-AD-Mobile_Email-V1_0-20051023-D. p, 1-28, figure 1. paragraphs 1.5.3.1.5.4.
MEM AD Review Report, OMA-ADRR-Mobile_Email-V1_0_0-20060719-D19 Jul. 2006) p. 1-31, p. 1, 17, 16.

* cited by examiner

Primary Examiner — Kyung H Shin

(57) ABSTRACT

A method, executed in a messaging server handles electronic messages for a user, handles electronic state messages for at least one terminal, and delivers electronic state messages to at least one terminal. A state change is identified in or at the messaging server, the state change relating to at least one electronic message associated with the user, the at least one electronic message containing a destination identity associated with the user. A terminal address associated with the at least one terminal used by the user is retrieved based on the destination identity associated with the user. An electronic state message is delivered to the at least one terminal using the terminal address as destination address.

14 Claims, 7 Drawing Sheets

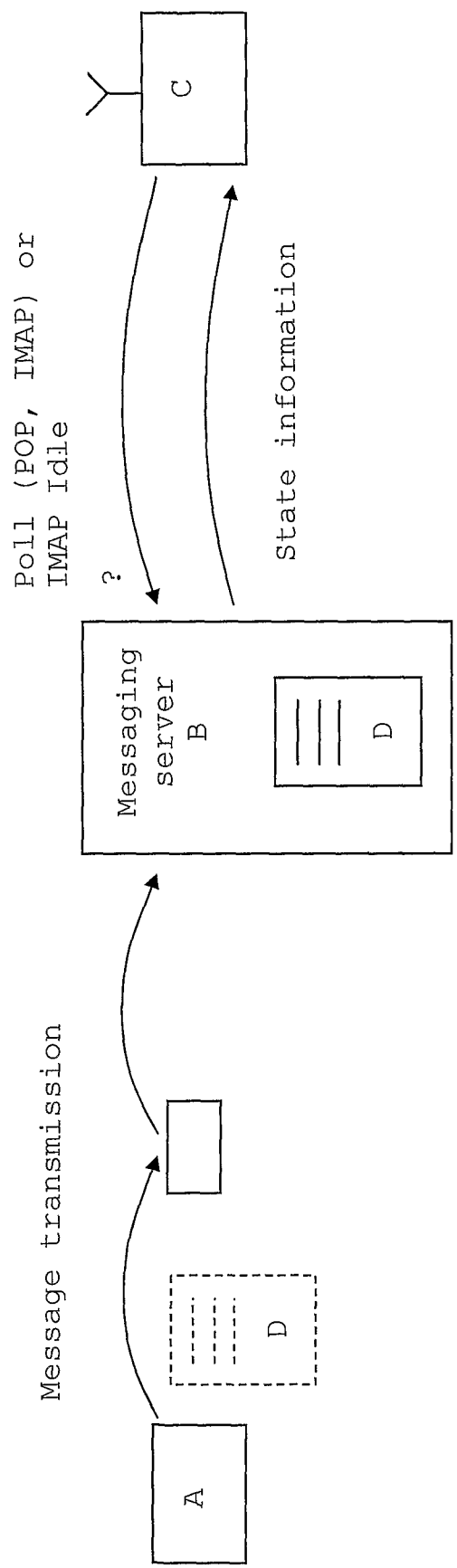

Fig. 3

METHOD AND ARRANGEMENT FOR DELIVERING ELECTRONIC STATE MESSAGE INFORMATION

TECHNICAL FIELD

The present invention relates to a method and an arrangement for delivering electronic state messages.

BACKGROUND

Today, electronic messages (e.g. e-mails) sent from a sending party to a receiving terminal in or over a communication network, e.g. the Internet or a communication network for mobile terminals, are commonly delivered to their recipients by means of a dedicated protocol, e.g. the Post Office Protocol (POP) or the Internet Message Access Protocol (IMAP). A common characteristic of this approach is that electronic messages directed to a receiving terminal or a recipient arrive at a server (herein called messaging server) associated with the receiving terminal. The messaging server may for example be an e-mail server. The electronic messages are then stored on the messaging server on the behalf of the recipient.

Instead of actually delivering the electronic messages from the messaging server to the receiving terminal, it has become a common usage pattern to use the deliverance protocol, e.g. POP or IMAP, not only as a message retrieval protocol, but as a means to manage (e.g. read, move or delete) electronic messages, e.g. e-mails, while maintaining them at the messaging server. This is a different usage pattern compared with the traditional pattern, in that the electronic messages are never forwarded to the receiving terminal (i.e. sent and removed from the messaging server), but the messages remain stored at the messaging server as long as the receiver or recipient wants to keep the electronic message.

In this usage pattern, the receiving terminal acts as a client only, e.g. an IMAP client or a POP client. The state kept by the receiving terminal is based on the information that the receiving terminal derives from its session(s) with the messaging server. The messaging server may e.g. be implemented as an IMAP server or a POP server, and hence said session(s) may e.g. be IMAP or POP session(s).

Effectively, this means that the receiving terminal or client builds up a cache or copy of the contents in the messaging server. The relation between the messaging server and the receiving terminal or client may be seen as a master-slave situation where the receiving terminal or client is the slave and contains a slave copy of the contents in the messaging server. The cache in the receiving terminal or client includes, e.g., mail bodies (e.g. rfc822 Content) and metadata for the mail bodies (e.g. IMAP flags), as well as folder states. One example of a folder state is the so-called "EXISTS" state which is a value that indicates the number of messages in a folder. The EXISTS state changes when the number of messages in a folder changes, e.g. when a new e-mail arrives or when an e-mail is deleted.

A common pattern for IMAP clients according to the background art, is to either use the method known as "IMAP IDLE" to connect to the messaging server, or to poll the IMAP server (a messaging server configured as IMAP server) for changes in the state of any information or item(s) that is accessible via IMAP. In either case, the IMAP client is notified regarding the state of the IMAP accessible information or item(s). This state often indicates how many messages there are in a folder and the state of the messages (e.g. new, recent, read). By comparing the new state with the cached state, the IMAP client can deduce what has changed and, if a new electronic message has arrived and the client is so configured, retrieve the new electronic message (partly, or in full).

The above described procedure is effectively what an IMAP client goes through every time a state change has occurred at the messaging server, e.g. when a new message has arrived at the messaging server. The effect is that the IMAP client 1) obtains an update of the current state of the IMAP accessible information or items(s) at the messaging server (e.g. the current state of the IMAP INBOX), and 2) downloads any newly arrived electronic messages. In case that other protocols are used, of course the state information available, is state information about information or item(s) that is accessible via that particular protocol (e.g. POP)

If the receiving terminal is an IMAP client, background art solutions require the receiving terminal/IMAP client to manage its state solely based on the data received by the receiving terminal/IMAP client via the IMAP sessions. If the receiving terminal is a POP client, the situation is analogous or similar, although the information conveyed to the receiving terminal is less rich than in the IMAP case. Maintaining or keeping an IMAP or POP session requires either polling the messaging server, or maintaining long lasting Transmission Control Protocol (TCP) connections, both of which cause excessive battery drain in the receiving terminal.

Currently there exist no battery or energy efficient ways of performing the state sharing or state managing for the receiving terminal in the case that the receiving terminal is implemented as an IMAP client or POP client. Of course this is also true for receiving terminals implemented as clients using protocols that are used in a similar way as the IMAP and POP protocols.

FIG. 1 illustrates the technique according to the prior art where a sending party A sends an electronic message D to a messaging server B. The receiving terminal C, e.g. a mobile terminal such as a mobile or cellular phone or a portable computer, associated with a recipient, polls the messaging server B or sets up an IMAP IDLE session to the messaging server B. Through the session(s) with the messaging server the receiving terminal manages its state. As said before, the receiving terminal may e.g. act as an IMAP or POP client.

Transmission of an electronic message from the sending party to the messaging server is normally done using the Short Message Transfer Protocol (SMTP). This provides an expedient delivery of the message to the recipient's messaging server.

Polling is generally deemed acceptable in fixed or wired networks. However, in wireless networks, repeated network traffic, e.g. to poll the messaging server, causes a large drain of the battery in the receiving terminal, e.g. a mobile terminal or a wireless mobile terminal. Moreover, the typically scarce radio resources are unnecessarily loaded or burdened by this repeated polling.

One solution to the problem described above which has been proposed is called the "IMAP IDLE extension". Once an IMAP session is established, the IMAP IDLE extension allows, d, the receiving terminal to obtain state information from the messaging server. However, one substantial disadvantage with this solution is the requirement to maintain a Transmission Control Protocol (TCP) session from the receiving terminal to the messaging server for the entire time period or duration it should be possible for the receiving terminal to obtain state information from the messaging server.

That is, the TCP session must be constantly maintained. To solve the problem of battery drainage, the TCP session is not allowed to send anything if there are no notifications or electronic messages to send. While this is indeed possible when using the TCP, it is not compatible with Network Address Translation nodes (NAT nodes) which may be present in the path between the messaging server and the receiving terminal. NAT nodes are considered to be transparent and the only way to ensure that a state kept or present in any occurring intermediate NAT node is maintained is to send refresh or update messages (either on TCP level or on higher levels) in order to maintain the TCP session "alive". This obviously counteracts the battery saving objective.

SUMMARY

It is an object of the present invention to address all or at least some of the problems outlined above. These objects and others may be obtained by providing methods and arrangements according to the independent claims stated in this application.

According to one aspect of the technique described herein, there is provided a method of delivering electronic state messages to at least one terminal. The method may be executed in a messaging server adapted to handle electronic messages for a user and adapted to handle electronic state messages for at least one terminal. In the method, i) a state change may be identified in or at said messaging server, said state change relating to at least one electronic message associated with said user. The at least one electronic message may advantageously contain a destination identity associated with said user. Further, ii) a terminal address associated with said at least one terminal used by said user, may then be retrieved. The retrieval of said terminal address may be based on said destination identity associated with said user. Additionally, iii) an electronic state message may then be delivered to said at least one terminal using said terminal address as destination address.

The method described herein may optionally have the following further characteristics:

The terminal address may be an Internet Protocol address currently assigned to the at least one terminal.

The terminal address may be a telephone number currently assigned to the at least one terminal.

Retrieving a terminal address, may be preceded by registering a terminal address of the at least one terminal. Said terminal address may be the Internet Protocol address of said at least one terminal and said terminal address may be registered in a Domain Name System Server connected to the messaging server.

Registration of the Internet Protocol address of the at least one terminal may be done in the Domain Name System server. Further, said registration may be done by issuing a Dynamic Domain Name System update to said Domain Name System server.

The Internet Protocol address may be retrieved by one or more of the following (i) to ii)) measures, i) looking up the destination identity associated with the user, in a directory connected to the messaging server, to retrieve the terminal identity of the at least one terminal used by said user, and ii) looking up said terminal identity of said at least one terminal, used by said user, in a Domain Name System server, to retrieve the Internet Protocol address currently assigned to said at least one terminal.

One of the protocols SMTP, LMTP, HTTP, SIP, MMS or SMS or any method within OMA Push may be used when the electronic state message is delivered to the at least one terminal.

The electronic state message may be delivered to the at least one terminal via at least one NAT node. Thereby, a second messaging server may be connected to said NAT node.

The electronic state message may be delivered to the at least one terminal via the second messaging server.

The terminal may be a mobile terminal.

According to another aspect, there is provided an arrangement in a messaging server. The messaging server may be adapted to handle electronic messages for a user and to handle electronic state messages for at least one terminal. The messaging server may further be adapted for delivering electronic state messages to at least one terminal. The arrangement may comprise one or more of the following elements (i) to iii)), i) an identifying element, for identifying a state change in or at said messaging server, wherein said state change may relate to at least one electronic message associated with said user. Said at least one electronic message may contain a destination identity associated with said user.

ii) a retrieving element, for retrieving a terminal address associated with said at least one terminal used by said user. The retrieval of said terminal address may be based on said destination identity associated with said user.

iii) a delivering element for delivering an electronic state message to said at least one terminal, whereby said terminal address may be used as destination address.

The arrangement described herein may optionally have the following further characteristics:

A registering element, for registering an Internet Protocol address of the at least one terminal in a Domain Name System server connected to the messaging server. Thereby may said Internet Protocol address at least partly constitute the terminal address.

The registering element may be adapted for registering a telephone number of the at least one terminal in a directory connected to the messaging server. Thereby may said telephone number at least partly constitute the terminal address.

The registering element may be adapted to register the Internet Protocol address of the at least one terminal in the Domain Name System server by issuing a Dynamic Domain Name System update to said Domain Name System server.

The retrieving element may be adapted to one or more of the following (i) to ii)):

i) look up the destination identity associated with the user in a directory connected to the messaging server in order to retrieve the terminal identity of the at least one terminal used by said user.

ii) look up said terminal identity of said at least one terminal used by said user in the Domain Name System server in order to retrieve the Internet Protocol address currently assigned to said at least one terminal used by said user.

The delivering element may be adapted to use one of the protocols SMTP, LMTP, HTTP, SIP, MMS or SMS, or any method within OMA Push, when delivering the electronic state message to the at least one terminal.

The delivering element may further be adapted to deliver the electronic state message to the at least one terminal via at least one NAT node. Thereby, a second messaging server may be connected to said NAT node.

The delivering element may also be adapted to deliver the electronic state message to the at least one terminal via the second messaging server.

The at least one terminal may be a mobile terminal.

The method described herein may also be described in the way that in a further aspect there is provided a method of delivering electronic messages directed to a user, wherein the method may comprise one or more of (i) to iii)):

i) receiving an electronic message at a mail server, said message containing a mail address associated with said user.

ii) retrieving an Internet Protocol address currently assigned to a terminal used by said user, based on said mail address associated with said user.

iii) delivering the electronic message to said terminal, using the retrieved IP address of the terminal.

The arrangement described herein may also be described in the way that in another aspect there is provided an arrangement for delivering electronic messages directed to a user. Said arrangement may comprise one or more of (i) to iii)):

i) means for receiving an electronic message at a mail server, said message containing a mail address associated with said user.

ii) means for retrieving an Internet Protocol address currently assigned to a terminal used by said user, based on said mail address associated with said user.

iii) means for delivering the electronic message to said terminal using the retrieved Internet Protocol address of the terminal.

Further possible features and benefits of the present invention will be explained in the detailed description below.

BRIEF DESCRIPTION OF THE DRAWINGS

The invention will now be described by way of non limiting embodiments with reference to the accompanying drawings in which:

FIG. 1 is a block diagram illustrating the technique of polling or establishing an IMAP IDLE session, known from the background art, FIG. 3 is a block diagram illustrating another example of a network topology where the method and arrangement described herein may be employed, according to another embodiment.

DETAILED DESCRIPTION

Before the method and arrangement described herein is described in detail, it is to be understood that this method and arrangement is not limited to the particular component parts of the devices described or steps of the methods described as such devices and methods may vary. It is also to be understood that the terminology used herein is used for describing particular exemplary embodiments only, and is not intended to be limiting. It must be noted that, as used in the specification and the appended claims, the singular forms "a," "an" and "the" also include plural referents unless the context clearly dictates otherwise. Thus, for example, reference to "an element" includes more than one such element, and the like.

Figure 2A:
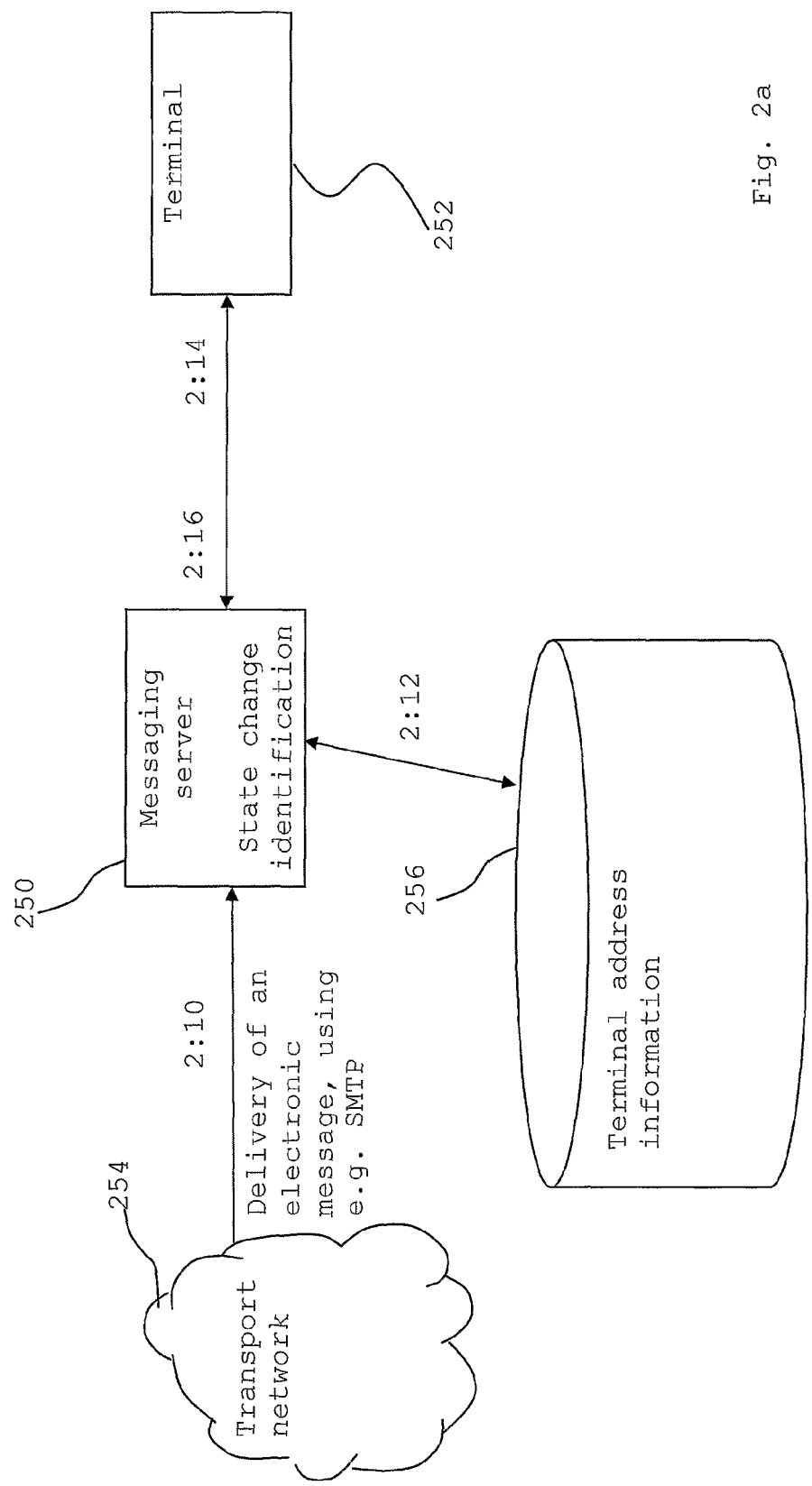
FIG. 2a is a basic block diagram schematically showing a way of providing state information to a terminal, according to the technique described herein.

Briefly described, a method and an arrangement are provided for delivering state information from a messaging server to a receiving terminal. The state information may relate to electronic messages stored at the messaging server and directed to a user of the receiving terminal. The state information may e.g. comprise how many electronic messages there are in different folders (e.g. inbox, drafts, sent, personally defined folders) and the state of an electronic message (e.g. new, recent, read). FIG. 2a is a drawing schematically showing one example of the technique described herein. In the messaging server 250 a state change is identified. A state change may e.g. be the arrival of an electronic message (illustrated at 2:10), but as will be described later, it may also be some other event in the messaging server 250. One such other event may be that the receiving terminal 250 sends a query or request (illustrated at 2:16) to the messaging server 250 to e.g. delete an electronic message from a folder at or in the messaging server 250, or to e.g. send an electronic message from the messaging server 250. Such a query or request may be sent by the receiving terminal 252 by establishing a session (e.g. an IMAP or POP session) with the messaging server 250. After a state change has been identified in or at the messaging server 250, transmittal of an electronic state message 224 to the receiving terminal 252 is initiated. The messaging server 250 checks or sends a query to (illustrated at 2:12) an information source 256, in order to retrieve terminal address information to use for sending the state information in the form of an electronic state message 224 to the receiving terminal 252. The information source 256 may be a directory or several different information sources, e.g. a directory and a DNS server. As a reply, the information source 256 sends terminal address information to the messaging server 250 (illustrated at 2:13). With the terminal address information retrieved from the information source 256, the messaging server 250 sends the electronic state message 224 to the receiving terminal 252 (illustrated at 2:14). Having received the electronic state message 224 from the messaging server 250, the receiving terminal 252 may update its state to be synchronized with the state in or at the messaging server 250. The messaging sever 250 may be the same kind of messaging server as the messaging server 200, 300 described in the following. The receiving terminal 252 may be the same kind of receiving terminal as the receiving terminal 202, 302 described in the following. The transport network 254 may be the same kind of transport network as the transport network 208, 308 described in the following. The transmission of a query or request illustrated with 2:16 in FIG. 2a, is illustrated with 2:7 in FIG. 2b, with 3:7a and 3:7b in FIG. 3 and with 4:7 in FIG. 4.

In this application, the term "receiving terminal" refers to a physical device. A client, such as an NAP client or POP client, is a software deployed on or implemented in such a device.

As discussed in the Background section, during an IMAP session an IMAP client 1) obtains an update of the current state of the IMAP accessible information or item(s) at the messaging server, and 2) downloads any newly arrived electronic messages.

According to the technique described herein, these two state items (the changed server state and the new electronic message) may be sent to the IMAP client without using a classic IMAP session. Instead, the messaging server may initiate the sending of an electronic message to the receiving terminal 252, 202, 302, 402 whenever necessary, the electronic message comprising the necessary state information and optionally also the body of any new electronic message(s). Such an electronic message (comprising state information) is called "electronic state message" 224 in this application.

In this way, the IMAP client may be notified of new electronic messages or other changes (i.e. updating its IMAP state), in a format that is compatible with the format used in an IMAP session, i.e. produced by IMAP natively. The user may thus continue to keep his/her electronic messages on the messaging server, all while enjoying the power and latency saving benefits of avoiding the receiving terminal 252, 202, 302, 402 having to poll the messaging server 250, 200, 300, 400 or having to establish an IMAP IDLE session. Since the IMAP client receives the state information in a format compatible with the format used in an IMAP (IDLE) session, the IMAP client may incorporate this information into its local cache management procedures just as if the IMAP client would have received the information by e.g. IMAP (IDLE). This brings the effect that the receiving terminal 252, 202, 302, 402 gives the impression of being a regular IMAP client.

Hence, the technique described herein is a way to provide fast and energy efficient access to e-mails.

In the technique described herein, the principle of using the receiving terminal 252, 202, 302, 402 as a client is combined with the principle of distributing information to the client in a non client-server way. Instead, the information is pushed to the receiving terminal 252, 202, 302, 402 by the messaging server 250, 200, 300, 400. In this way several advantages are achieved; power and latency savings as well as convenient roaming between different receiving terminal(s) 252, 202, 302, 402, and one single updated message structure on the messaging server 250, 200, 300, 400.

The term "terminal" used herein may mean a mobile terminal, e.g. a mobile or cellular phone or a portable computer, but it may also mean some other type of terminal possible to connect to a communication network.

Instead of using a client-server protocol (such as POP or IMAP) for providing the receiving terminal with state information relating to electronic messages stored at the messaging server, the method and arrangement described herein uses other protocols, for example the SMTP, the Local Mail Transfer Protocol (LMTP), the Hyper Text Transfer Protocol (HTTP), the Session Initiation Protocol (SIP), the Short Message System (SMS) protocol, the Multimedia Messaging Service (MMS) protocol or any method within OMA Push (Open Mobile Alliance Push) for the communication from the messaging server to the receiving terminal 252, 202, 302, 402. By doing so, the receiving terminal do not have to send anything to the messaging server if there is no state information to be received, thus saving battery capacity.

The technique described herein is not dependent on which protocol that is used for the communication from the messaging server 250, 200, 300, 400 to the receiving terminal 252, 202, 302, 402. It is sufficient that appropriate address information is available for the messaging server 250, 200, 300, 400 so that the messaging server 250, 200, 300, 400 can send a message from the messenger server 250, 200, 300, 400 to the receiving terminal 252, 202, 302, 402. Naturally, the protocol used has to be suitable for sending messages from a messaging server 250, 200, 300, 400 to a receiving terminal 252, 202, 302, 402.

When using protocols (e.g. SMTP, LMTP, HTTP or SIP) that use the IP address of the receiving terminal 252, 202, 302, 402 to send a message, the user needs to register its receiving terminal 252, 202, 302, 402 in order to retain the ability for the user to roam or move between different receiving terminals 252, 202, 302, 402 and/or accesses. The receiving terminal 252, 202, 302, 402 has to be registered as a receiving terminal 252, 202, 302, 402 which should be able to receive state information from the messaging server 250, 200, 300, 400.

Figure 4:
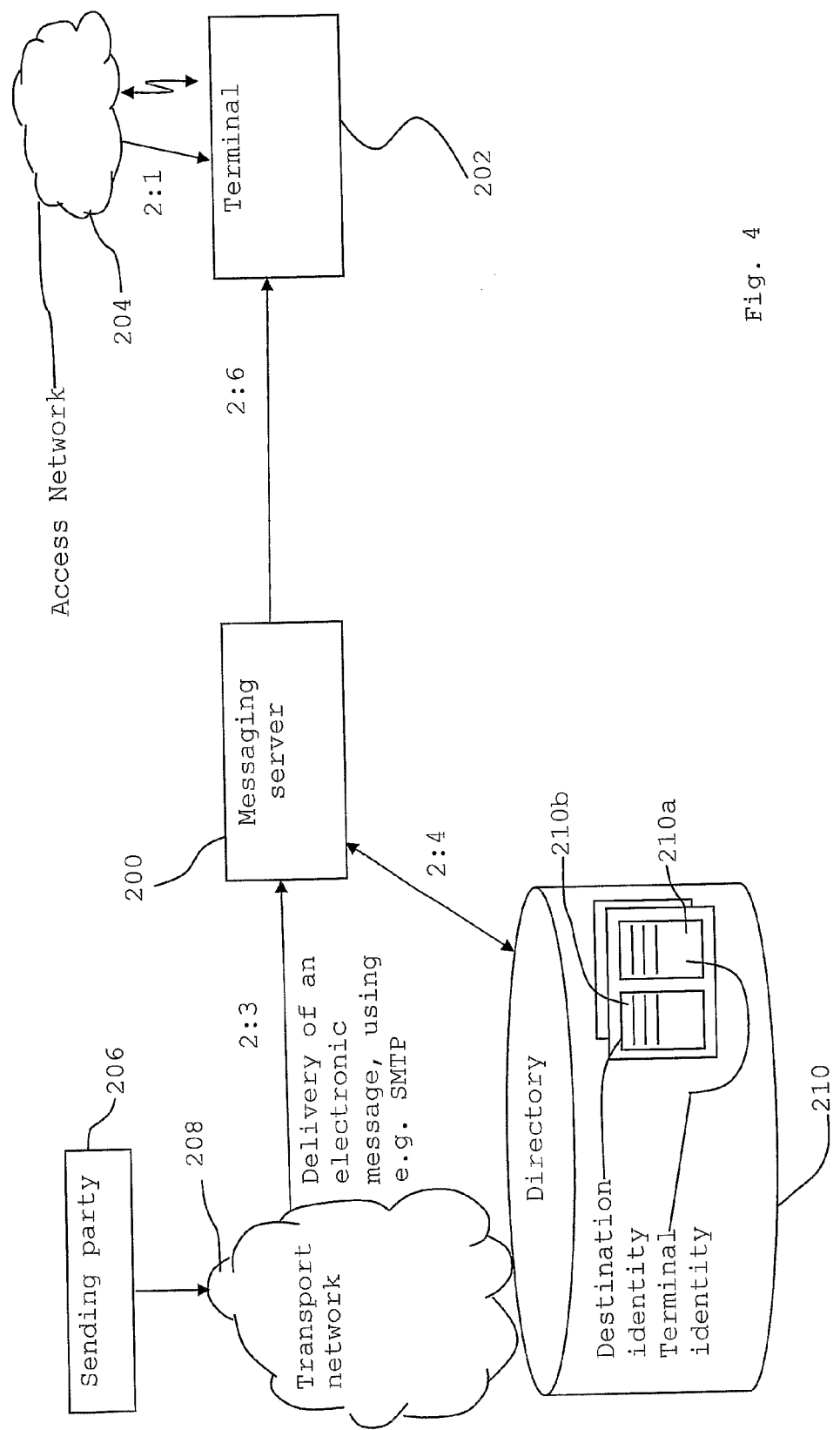
FIG. 4 is a block diagram showing a possible network topology starting from the topology shown in FIG. 2b and assuming that a DNS is not necessary.
Figure 5:
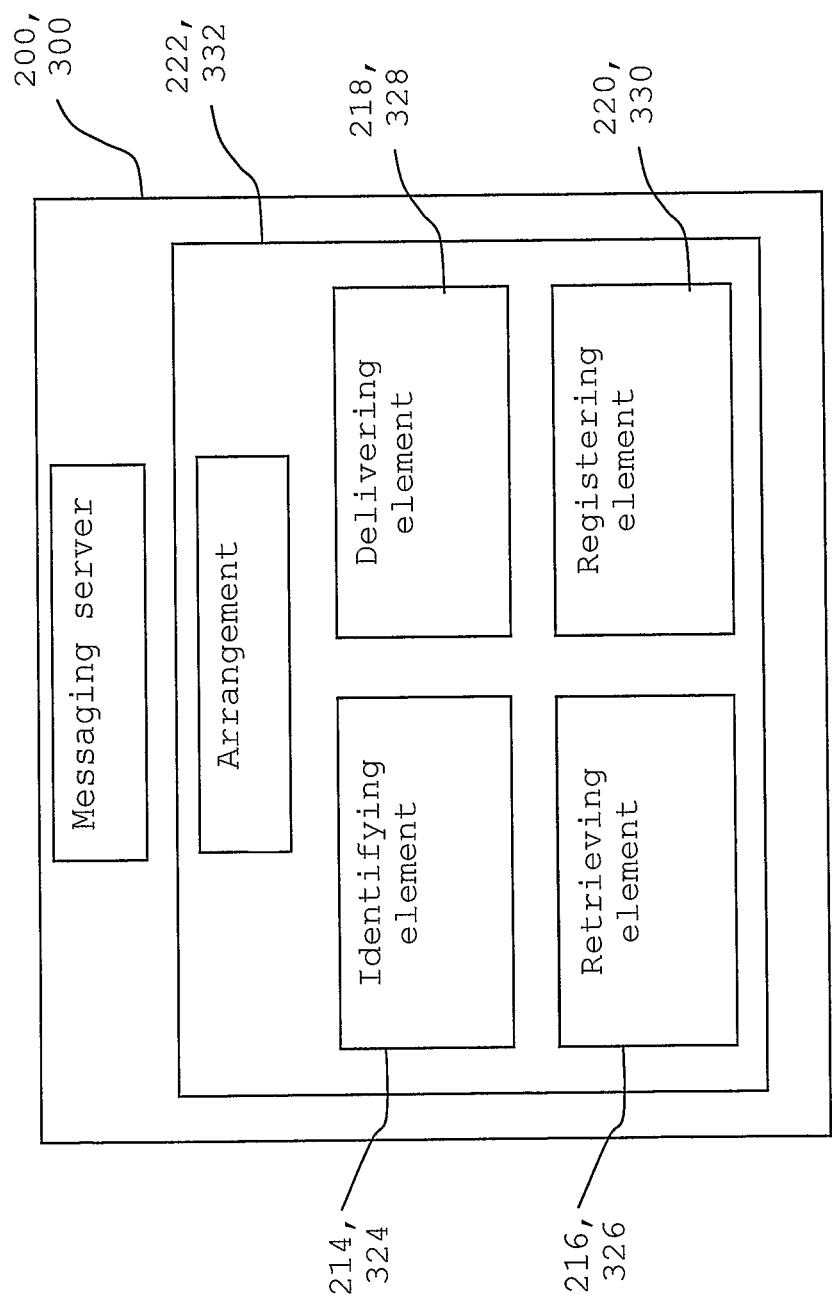
FIG. 5 is a drawing showing a detailed view of one example of an arrangement 222, 332 in a messaging server 250, 200, 300, 400.
Figure 6:
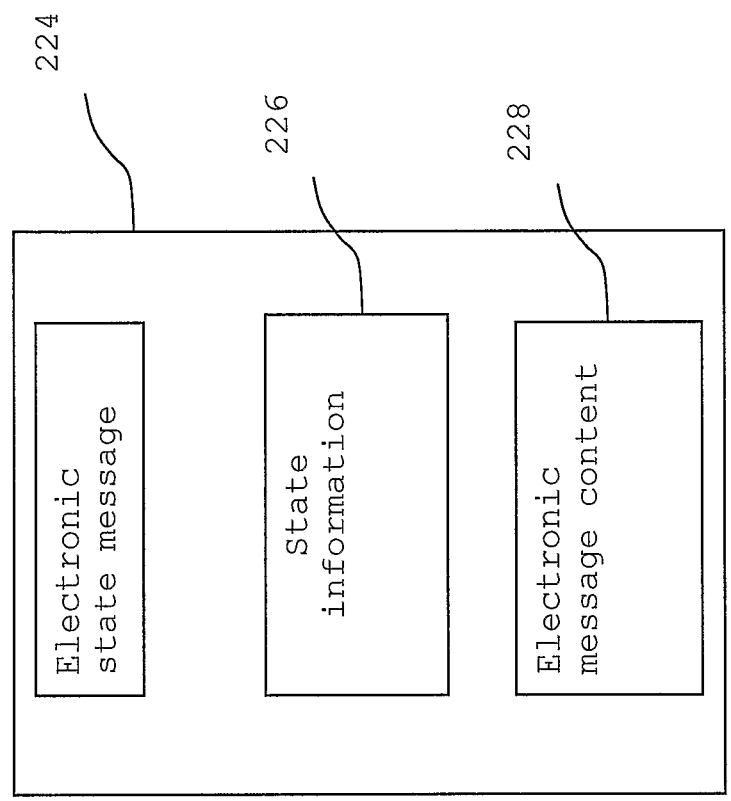
FIG. 6 illustrates a logic structure of an exemplary electronic state message 224.

When using protocols (e.g. SMS, MMS or any method within OMA Push) that use the telephone number of a receiving terminal 252, 202, 302, 402 to send a message to the receiving terminal 252, 202, 302, 402, the user do not need to register its receiving terminal 252, 202, 302, 402 since the telephone number of a receiving terminal 252, 202, 302, 402 is more or less fixed and often defines the identity of a receiving terminal 252, 202, 302, 402. The telephone number of a receiving terminal 252, 202, 302, 402 is often in some way registered in the directory 210, 310, 410 of a messaging server 250, 200, 300, 400 by the service provider when a receiving terminal 252, 202, 302, 402 is first used or switched on with a certain telephone number. Such a registration may involve a registering element 220, 330 in the messaging server 250, 200, 300, 400. One example of a network topology in the case that the telephone number is used to send a message to a receiving terminal 252, 202, 302, 402 is shown in FIG. 4.

Relating to Protocols Using the IP-Address to Send Messages

One way of implementing the registration which is advantageous in case of protocols such as e.g. SMTP, LMTP, HTTP or SIP is to use Dynamic DNS server procedures (DNS Server=Domain Name System Server). An example of such an implementation will be described in the following. By using a DNS server, a connecting layer between the destination identity associated with the user (e.g. the e-mail address of the user), and the IP address currently used by the receiving terminal 252, 202, 302, 402 of the user, is achieved. This facilitates one embodiment of the implementation of the method and arrangement described herein in the messaging server 250, 200, 300, 400 and enables the use of existing terminal protocols for the registration of the IP address of the receiving terminal 252, 202, 302, 402 with or at the messaging server 250, 200, 300, 400 in this embodiment. The destination identity or address associated with the user is also the destination identity of the electronic message.

In this way the messaging server 250, 200, 300, 400 can send state information relating to electronic messages with a certain destination identity to the correct receiving terminal 252, 202, 302, 402. The correct receiving terminal 252, 202, 302, 402 being a receiving terminal 252, 202, 302, 402 associated with the destination identity of the electronic message(s) in question. The association of a receiving terminal 252, 202, 302, 402 with a certain destination identity is achieved by means of (as shown in FIGS. 2 and 3):

a. associating (in e.g. a DNS) the current IP address of the receiving terminal 252, 202, 302, 402 with the terminal identity, b. associating (in e.g. a directory) the terminal identity with the destination identity of the electronic message(s) in question.

Figure 3:
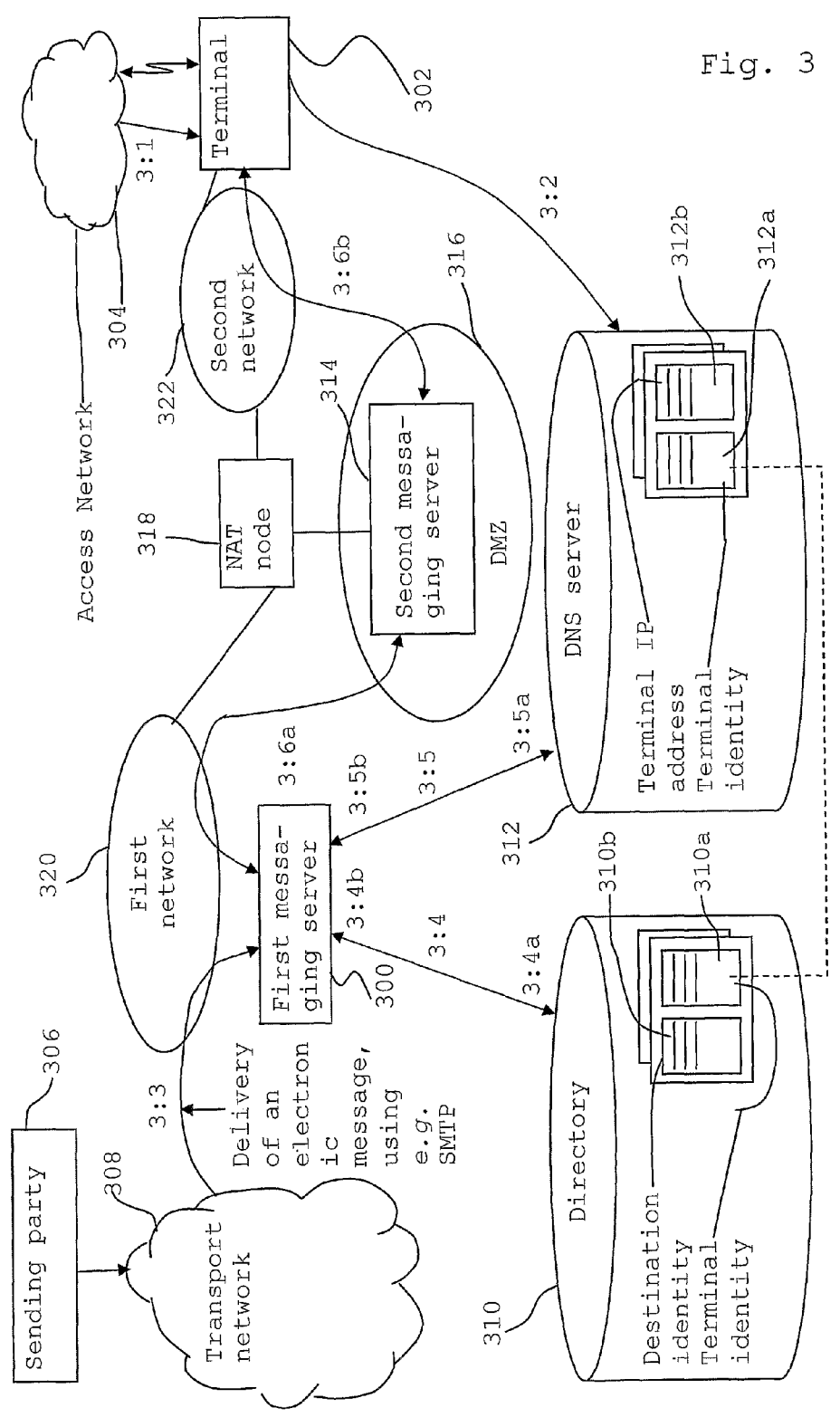

Referring to FIGS. 2 and 3 the principle in this embodiment of the method and arrangement described herein will now be described.

Figure 2B:
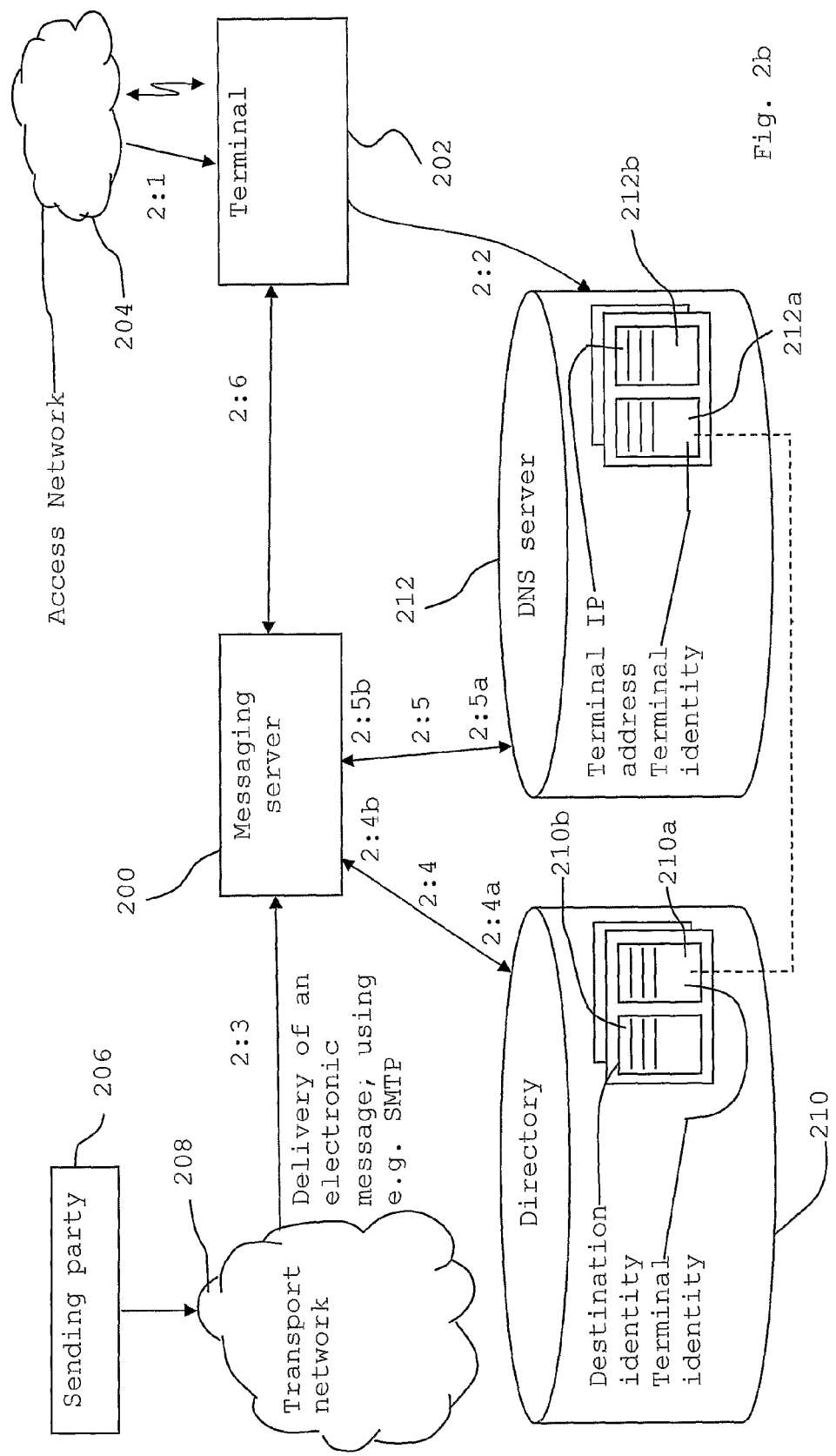
FIG. 2b is a block diagram illustrating one example of a network topology where the method and arrangement described herein may be employed, according to one embodiment.

FIG. 2*b* illustrates a messaging server 200 adapted to deliver electronic state messages 224 to a receiving terminal 202 (e.g. a mobile terminal), FIG. 3 illustrates a messaging server 300 adapted to deliver electronic state messages 224 to a receiving terminal 302 (e.g. a mobile terminal) via at least one NAT node 318 and one second messaging server 314.

In steps 2:1 and 3:1 the terminal 202 and 302 respectively, receives an IP address from an Access network 204 respectively 304, for example a Mobile access network. When the receiving terminal 202, 302 has received an IP address it is online.

Registration

The receiving terminal 202, 302 advantageously should register with/at the messaging server 200, 300. To do that the receiving terminal 202, 302 may issue a message called DynamicDNS update to the DNS server 212, 312 (steps 2:2, 3:2) indicating the terminal IP address of the receiving terminal 202, 302, on which the receiving terminal 202, 302 can receive electronic messages, e.g. electronic state messages 224, and the receiving terminal identity (e.g. the terminal domain name based on the terminal telephone number). One way of creating the terminal identity for a mobile terminal is to use Telephone Number Mapping (tElephone NUmber Mapping, ENUM) using the Mobile Subscriber ISDN Number (MSISDN). The MSISDN refers to the telephone number of a mobile subscriber. In this way a terminal identity in the form of a domain name can be created from the telephone number of the receiving terminal 202, 302. Also for other receiving terminals 202, 302 that do not have a telephone number ENUM may be used. There merely has to be defined a set of numerals as starting point for the ENUM. The DynamicDNS update may be issued by the receiving terminal 202, 302 directly to the DNS server 212, 312 but it may also be issued to the DNS server 212, 312 via a registering element 220, 330 in the messaging server 200, 300. Hence, in the DNS server 212, 312 the terminal IP address and the terminal identity (e.g. terminal domain name) of the receiving terminal 202, 302 are stored and linked to each other. This link between terminal IP address and terminal identity is illustrated in FIGS. 2 and 3 by the entries 212a and 312a and the records 212b and 312b in the DNS servers 212 and 312 respectively. That is, one entry 212a is linked to a record 212b and one entry 312a is linked to a record 312b. The references 212b, 312b represent a number of records (in the figures 3 lines are shown, each line representing one record) and the references 212a and 312a represent entries of terminal identities (in the figures 3 lines are shown, each line representing one entry).

The link in the DNS server 212, 312 between the terminal IP address and the terminal identity may be implemented by associating the entry of the terminal identity with a record containing the terminal IP address. One may e.g. use records of the types Mail Exchange Resource Record (MX RR), Address Resource Record (A RR), Service Record (SRV) or Naming Authority Pointer (NAPTR).

The link between the destination identity of the electronic message (e.g. an e-mail address associated with a user) and the terminal identity (e.g. a terminal domain name or terminal telephone number) is achieved by using a directory 210, 310 connected to the messaging server 200, 300. Messaging servers 200, 300 (e.g. e-mail servers) commonly have a directory that enables this functionality. This link between destination identity and terminal identity is illustrated in FIGS. 2 and 3 by the objects 210b and 310b and the attributes 210a and 310a in the directories 210 and 310. That is, one object 210b is linked to an attribute 210a and one object 310b is linked to an attribute 310a. The references 210a, 310a represent a number of attributes (in the figures 3 lines are shown, each line representing one attribute) and the references 210b and 310b represent objects comprising destination identities (in the figures 3 lines are shown, each line representing one object).

When a user subscribes (with a service provider) to the service of having access to an electronic messages service (e.g. an e-mail service), the service provider registers (in the directory 210, 310) the destination identity of the user (e.g. an e-mail address associated with the user) and the terminal identity (e.g. a terminal domain name or a terminal telephone number) of the receiving terminal 202, 302 that the user wants to be able to access electronic messages with. Such a registration may involve a registering element 220, 330 in the messaging server 200, 300.

It is also possible to register several receiving terminals 202, 302 for having access to an electronic messages service. In this case the terminal identity in the directory 210, 310 does not represent one terminal but a group of terminals. In the DNS server 212, 312 this group terminal identity is then associated with several records where each record contains the terminal IP address of one receiving terminal 202, 302 in the group. In this multi terminal case the user may e.g. select that all receiving terminals should receive state information relating to electronic messages stored at the messaging server.

Delivery of Electronic State Messages when the Receiving Terminal 202, 302 is Registered and Online In a step 2:3, 3:3 the messaging server 200, 300 receives an electronic message coming from a sending party 206, 306 via a transport network 208, 308. The electronic message is directed to a destination identity, for example an e-mail address, associated with a user of the receiving terminal 202, 302. The messaging server then stores the received electronic message at the messaging server. The arrival of an electronic message at the messaging server 200, 300 is one example of an event that is a state change.

The messaging server 200, 300 now needs to find out where to send state information relating to the change in state because of the arrival of the electronic message. To do that the messaging server 200, 300 in steps 2:4 and 3:4 looks up the destination identity in the Directory 210, 310, to find the corresponding terminal identity. The steps 2:4 and 3:4 may be performed in two parts, first the messaging server 200, 300 checks or sends a query or request to (illustrated at 2:4a and 3:4a) the directory 210, 310. As a reply, the directory 210, 310 sends the terminal identity to the messaging server 200, 300 (illustrated at 2:4b and 3:4b).

The messaging server 200, 300 then checks the DNS server 212, 312 for which IP address to use for sending to the terminal identity previously retrieved. In step 2:5 respectively 3:5 the messaging server 200 respectively 300 retrieves the IP address registered by the receiving terminal 202 respectively 302, then initiates a connection to the receiving terminal 202 respectively 302, and sends an electronic state message 224, using the retrieved IP address, in steps 2:6 respectively 3:6. Steps 2:5 and 3:5 may be performed in two parts, first the messaging server 200, 300 checks or sends a query or request to (illustrated at 2:5a and 3:5a) the DNS server 212, 312. As a reply, the DNS server 212, 312 sends the terminal IP address to the messaging server 200, 300 (illustrated at 2:5b and 3:5b).

Delivery of Electronic State Messages when the Receiving Terminal 202, 302 is Registered and Offline Steps 2:3, 3:3, 2:4, 3:4 and 2:5, 3:5 are performed as above but the messaging server 200, 300 fails to connect to the receiving terminal 202, 302 as the messaging server 200, 300 tries to initiate a connection to the receiving terminal 202, 302. Because of this the messaging server 200, 300 spooles or queues the electronic state message 224 in the messaging server 200, 300 for later delivery.

Updating the DNS Server 212, 312

When the receiving terminal 202, 302 reconnects to an access network (e.g. a mobile access network), e.g. when the receiving terminal 202, 302 is switched on after having been switched off, or after having lost contact with the access network, the DNS server 212, 312 needs to be updated with the IP address currently assigned to the receiving terminal 202, 302. This may be done in several ways. One possibility is that the receiving terminal 202, 302 issues a DynamicDNS update to the DNS server 212, 312 so that the DNS server 212, 312 contains the presently valid IP address of the receiving terminal 202, 302. Another possibility is that a node (e.g. a Gateway GPRS Support Node, GGSN) in the access network issues an update command to the DNS server 212, 312. These updates may be issued directly to the DNS server 212, 312 or via a registering element 220, 330 in the messaging server 200, 300. The mentioned update possibilities are of course also possible to use for the deregistration of the receiving terminal 202, 302.

Forwarding of Electronic State Messages Queued or Spooled in the Messaging Server 250, 200, 300, 400:

When the receiving terminal 252, 202, 302, 402 reconnects to an access network 204, 304, 404 after the receiving terminal 252, 202, 302, 402 has been disconnected, electronic state messages 224 that have been queued or spooled on the messaging server 250, 200, 300, 400 need to be sent to the receiving terminal 252, 202, 302, 402. This may be done in several ways, one possibility is that the receiving terminal 252, 202, 302, 402 contacts the messaging server 250, 200, 300, 400 for the purpose of initiating message transmission from the messaging server 250, 200, 300, 400 to the receiving terminal 252, 202, 302, 402. The receiving terminal 252, 202, 302, 402 may contact the messaging server 250, 200, 300, 400 using e.g. the TURN protocol (Traversal Using Relay NAT), ODMR (On Demand Mail Relay, ODMR is also called ATRN, Authenticated Turn), or LMTP. In case of protocols using the IP-address of the receiving terminal 202, 302 to send messages, one may also use the fact that the DNS server 212, 312 is updated with the current IP address of the receiving terminal 202, 302 when the receiving terminal 202, 302 reconnects to an access network 204, 304. One possibility is that the messaging server 200, 300 polls or asks the DNS server 212, 312 to check if the record of the receiving terminal 202, 302 in the DNS server 212, 312 has been updated. Another possibility is that the DNS server 212, 312 sends an update message to the messaging server 200, 300 when the record of the receiving terminal 202, 302 in the DNS server 212, 312 has been updated. When the messaging server 200, 300 has been updated in either of these ways, or any other suitable way, the messaging server 200, 300 initiates transmission of electronic state messages 224 from the messaging server 200, 300 to the receiving terminal 202, 302.

Deregistration

When the receiving terminal 202, 302 deregisters from the messaging server 200, 300 it issues a DynamicDNS update (2:2, 3:2) to the DNS server 212, 312 indicating the terminal IP address and terminal identity of the receiving terminal 202, 302 that should be removed from the DNS server 212, 312. As mentioned before, the DynamicONS update may be sent directly to the DNS server or via a registering element 220, 330 in the messaging server 200, 300, deregistration may also be conducted by a node in the access network, e.g. a Gateway GPRS Support Node (GGSN).

Protocols Using a Telephone Number to Send Messages

Some protocols, e.g. as mentioned the SMS and MMS protocols and methods within OMA Push, use the telephone number of a receiving terminal 252, 202, 302, 402 to communicate with the receiving terminal 252, 202, 302, 402. Accordingly, in cases when a messaging server 250, 200, 300, 400 uses such a protocol, there is no need for a DNS server and in the directory 210, 310, 410 the telephone number of the receiving terminal 252, 202, 302, 402 is stored as the terminal identity. As mentioned before, the telephone number is often registered in the directory 210, 310, 410 by the service provider. Such a registration may involve a registering element 220, 330 in the messaging server 250, 200, 300, 400. Since the telephone number of the receiving terminal 252, 202, 302, 402 often defines the identity of the receiving terminal 252, 202, 302, 402 no further registration is necessary in these cases. When there is a need for the messaging server 250, 200, 300, 400 to send an electronic state message 224 relating to electronic messages having a certain destination identity or relating to a service for electronic messages where the service relates to a certain destination identity, the messaging server 250, 200, 300, 400 checks the directory 210, 310, 410 to retrieve the terminal telephone number corresponding to that destination identity.

If the receiving terminal 252, 202, 302, 402 is not online for some reason, e.g. may the terminal be switched off or may have lost contact with the access network 204, 304, 404, the messaging server 250, 200, 300, 400 will receive a notification that the electronic state message(s) 224 could not be delivered. The electronic state message(s) then have to be queued or spooled at the messaging server 250, 200, 300, 400. When the receiving terminal 252, 202, 302, 402 is online again the messaging server 250, 200, 300, 400 may be notified about this in some suitable way and the messaging server 250, 200, 300, 400 may send the queued or spooled electronic state messages to the receiving terminal 252, 202, 302, 402. It is also possible that the messaging server 250, 200, 300, 400 repeatedly tries to send the electronic state message(s) 224 in case that the messaging server 250, 200, 300, 400 receives a is notification that the electronic state message(s) 224 could not be delivered to the receiving terminal 252, 202, 302, 402.

One example of a network topology corresponding to the situation that a protocol is used, which use the telephone number of a receiving terminal 252, 202, 302, 402 to communicate with the receiving terminal 252, 202, 302, 402, is shown in FIG. 4. The messaging server 400 may be the same kind of messaging server as the messaging server 200, 300. The receiving terminal 402 may be the same kind of receiving terminal as the receiving terminal 202, 302. The sending party 406 may be the same kind of sending party as the sending party 206, 306. The transport network 408 may be the same kind of transport network as the transport network 208, 308. The directory 410 may be the same kind of directory as the directory 210, 310.

Protocols Used

Regarding the protocol to be used for the delivery of electronic state messages 224 from the messaging server 250, 200, 300, 400 to the receiving terminal 252, 202, 302, 402, it is in some circumstances advantageous to use SMTP. One such case is when there is a NAT node 318 in the path between a first messaging server 300 and the terminal 302 (FIG. 3).

In the topology shown in FIG. 3 the second messaging server 314 is used to circumvent a NAT node 318. This is a common measure in networks, for example the Internet. With the use of SMTP it is possible to send a message, e.g. an electronic state message 224, from the first messaging server 300 to the terminal 302 via the second messaging server 314. With other protocols this is not necessarily possible. If for example HTTP is used to send an electronic state message 224 from the first messaging server 300 to the terminal 302 there must be a direct connection between the first messaging server 300 and the terminal, as shown in FIG. 2b.

Because the terminal IP address is linked to the terminal identity (as registered in the DNS server 212, 312) the electronic state message 224 can be sent from a first network 320 to a second network 322 (see FIG. 3) in spite of the fact that the IP address of the terminal 302 may be used for some other purpose in the first network 320.

Electronic State Message

An electronic state message 224 may contain different kinds of information, e.g. state information 226 but also complete electronic messages, hereafter called electronic message content 228, e.g. e-mails. State information 226 may be information relating to states regarding an e-mail account at the messaging server 200, 300. State information 226 may hence be state information for different folders, examples of folders may be Inbox, Sent, Deleted or Drafts, and state information may also be state information for an electronic message.

Which type of information that may be incorporated in an electronic state message 224 may e.g. be dependent on which protocol that is used to send the electronic state message 224. If e.g. an electronic state message 224 is sent via SMS or any method within OMA Push, the maximum size of a message is relatively small and it may be the case that it is only possible to incorporate state information 226 in the electronic state message 224. In the case that other protocols (e.g. SMTP, LMTP, HTTP or SIP or MMS) are used to send an electronic state message 224 it may be possible to incorporate electronic message content 228 in the electronic state message 224 in addition to state information 226.

To illustrate the technique described herein the case that the receiving terminal 252, 202, 302, 402 is implemented as an IMAP client and the messaging server 250, 200, 300, 400 is implemented as an IMAP server will be described. The IMAP server has different folders for electronic messages, inter alia an Inbox.

Let the IMAP state for the Inbox be called A, A is called "folder state object". Let the state for an electronic message, e.g. an e-mail, in the Inbox (the electronic message comprising rfc822 body and metadata) be called Mi, Mi is called "electronic message state object".

Whenever a state change occurs on the IMAP server (such as e.g. the arrival of a new electronic message, e.g. a new e-mail), A is turned into A'. If the state change comprises the arrival of a new electronic message a new electronic message state object Mi is also created.

Other examples of state changes are events initiated by the receiving terminal 252, 202, 302, 402. When a user e.g. wants to erase or send an electronic message, the receiving terminal 252, 202, 302, 402 starts a communication session, e.g. an IMAP or POP session, with the messaging server 250, 200, 300, 400 and initiates the desired operation on the messaging server. Such events are hence also examples of state changes.

Other examples of state changes are events initiated by the messaging server 250, 200, 300, 400 and/or by the service provider. Such events may be deletion of electronic messages older than a certain limit, storage space limitations leading to limitations in sending new electronic messages, moving electronic messages between folders according to different criteria, such criteria may e.g. be elapsed time since arrival of the message, content of the message.

Of course also other state changes are possible, the listing above are just examples of different possible state changes. Regardless of the type of state change, the technique described herein is suitable for sending electronic state messages containing state information regarding the state change, to one or more receiving terminal(s) 252, 202, 302, 402.

In the case that the user has more than one receiving terminal 252, 202, 302, 402 a state change is advantageously transmitted (in the form of an electronic state message 224) to all receiving terminals 252, 202, 302, 402. This is advantageously also the case when the state change is initiated or caused by one of the receiving terminals 252, 202, 302, 402.

But it may also be the case that the state change is not transmitted to the receiving terminal 252, 202, 302, 402 that caused the state change. The state change may also be transmitted to the receiving terminal 252, 202, 302, 402 causing the state change, by some other technique, e.g. within an IMAP or POP session.

In one implementation of the technique described herein the new Inbox state object A' and the new electronic message state object Mi is placed in an electronic state message 224 together with electronic message content 228 (the new electronic message itself) and sent (e.g. in the form of an e-mail) to the receiving terminal(s) 252, 202, 302, 402. Upon reception of such an electronic state message 224, the IMAP client of the receiving terminal 252, 202, 302, 402 augments its cached IMAP state with the received information about the Inbox state, the electronic message state and the new electronic message (thereby effectively emulating an rfc822.peek IMAP operation).

The electronic message state object Mi may contain both state information about an electronic message and the electronic message itself but it may also contain only state information about the electronic message. The receiving terminal 252, 202, 302, 402/IMAP client may retrieve the electronic message itself using regular IMAP procedures in case that the electronic message state object Mi only contains state information about the electronic message.

In another implementation, the difference between two folder state objects A and A' is sent to the receiving terminal 252, 202, 302, 402 instead of the full A' folder state object. This will reduce the size of the electronic state message 224 and hence of the transmission. It is also possible to send the difference between two electronic message state objects Mi and Mi' instead of a full Mi electronic message state object.

Generally, the state information possible to send from the messaging server 250, 200, 300, 400 to the receiving terminal 252, 202, 302, 402, is any state information that relates to information or item(s) (e.g. folders or electronic messages) that is accessible via the protocol in question. If e.g. the messaging server 250, 200, 300, 400 is implemented as an IMAP server, IMAP is the protocol in question. If e.g. the messaging server 250, 200, 300, 400 is implemented as a POP server, POP is the protocol in question. As mentioned below, the method described herein is of course also suitable by other protocols that function in a way similar to IMAP or POP.

Regarding transmissions, the transmissions with reference signs 2:10, 2:3, 3:3 and 4:3 refer to the same kind of transmission. Also the transmissions with reference signs 2:14, 2:6, 3:6 and 4:6 refer to the same kind of transmission, wherein transmission 3:6 is divided into transmissions 3:6a and 3:6b. The transmissions with reference signs 2:16, 2:7, 3:7 and 4:7 as well refer to the same kind of transmission, wherein transmission 3:7 is divided into transmissions 3:7a and 3:7b. The transmissions 2:12 and 2:13 in FIG. 2a functionally correspond to the transmissions 2:4a, 2:4b, 2:5a and 2:5b in FIG. 2b, in the sense that the messaging server retrieves terminal address information. The transmissions 2:12 and 2:13 in FIG. 2a functionally also corresponds to the transmissions 3:4a, 3:4b, 3:5a and 3:5b in FIG. 3, in the sense that the messaging server retrieves terminal address information. The transmissions 2:12 and 2:13 in FIG. 2a functionally also corresponds to the transmissions 4:4a and 4:4b in FIG. 4, in the sense that the messaging server retrieves terminal address information.

The technique described herein has been illustrated partly by referring to the case that the messaging server 250, 200, 300, 400 is an IMAP server and the receiving terminal 252, 202, 302, 402 is an IMAP terminal but the technique described herein is of course suitable also by other protocols that function in a way similar to the IMAP protocol. One example is the POP protocol, as mentioned in this application. But the technique described herein is of course suitable also by other protocols that function in a way similar to the IMAP and POP protocols. That is, for example in case of protocols where the receiving terminal 252, 202, 302, 402 also builds up a cache of the content at the messaging server 250, 200, 300, 400.

Although particular embodiments have been disclosed herein in detail, this has been done by way of example for purposes of illustration only, and is not intended to be limiting with respect to the scope of the appended claims that follow. In particular, it is contemplated by the inventor that various substitutions, alterations, and modifications may be made to the invention without departing from the spirit and scope of the invention as defined by the claims.

The invention claimed is:

1. A method, executed in a messaging server for handling electronic messages for a user, handling electronic state messages for at least one IMAP terminal, and delivering electronic state messages to at least one IMAP terminal, said method comprising the following steps:
   identifying a state change in or at said messaging server, said state change relating to at least one electronic message associated with said user, said at least one electronic message containing a destination identity associated with said user,
   looking up said destination identity associated with said user, in a directory connected to said messaging server, to retrieve the terminal identity of said at least one IMAP terminal used by said user,
   looking up said terminal identity of said at least one IMAP terminal, used by said user, in a Domain Name System server, to retrieve the Internet Protocol address currently assigned to said at least one IMAP terminal, and
   delivering an electronic state message to said at least one IMAP terminal, without using an IMAP session, using said Internet Protocol address as destination address, wherein the electronic state message comprises updated state information and a body of the at least one electronic message.

2. A method according to claim 1, wherein:
   the step of retrieving a terminal address is preceded by the step of registering the Internet Protocol address of said at least one IMAP terminal in a Domain Name System Server connected to said messaging server.

3. A method according to claim 2, wherein:
   registering the Internet Protocol address of said at least one IMAP terminal in said Domain Name System server is done by issuing a Dynamic Domain Name System update to said Domain Name System server.

4. A method according to claim 1, wherein:
   one of the protocols SMTP, LMTP, HTTP, SIP, MMS or SMS or any method within OMA Push is used during said step of delivering said electronic state message to said at least one IMAP terminal.

5. A method according to claim 1, wherein:
   said electronic state message is delivered to said at least one IMAP terminal via at least one NAT node whereby a second messaging server is connected to said NAT node.

6. A method according to claim 5, wherein:
   said electronic state message is delivered to said at least one IMAP terminal via said second messaging server.

7. A method according to claim 1, wherein said at least one IMAP terminal is a mobile terminal.

8. A messaging server for handling electronic messages for a user, handling electronic state messages for at least one IMAP terminal, and delivering electronic state messages to at least one IMAP terminal, comprising:
   a memory;
   a processor;
   an identifying element adapted, when executed by the processor, for identifying a state change in or at said messaging server, said state change relating to at least one electronic message associated with said user, said at least one electronic message containing a destination identity associated with said user, and
   a retrieving element adapted, when executed by the processor, for:
      looking up said destination identity associated with said user in a directory connected to said messaging server to retrieve the terminal identity of said at least one IMAP terminal used by said user, and
      looking up said terminal identity of said at least one IMAP terminal used by said user in said Domain Name System server to retrieve the Internet Protocol address currently assigned to said at least one IMAP terminal used by said user
   a delivering element adapted, when executed by the processor, for delivering an electronic state message to said at least one IMAP terminal, without using an IMAP session, using said terminal address as destination address, wherein the electronic state message comprises updated state information and a body of the at least one electronic message.

9. The messaging server of claim 8, comprising:
   a registering element adapted, when executed by the processor, for registering an Internet Protocol address of said at least one IMAP terminal in the Domain Name System server, connected to said messaging server, said Internet Protocol address at least partly constituting said terminal address.

10. The messaging server of claim 9, wherein:
    the registering element is adapted, when executed by the processor, to register said Internet Protocol address of said at least one IMAP terminal in said Domain Name System server by issuing a Dynamic Domain Name System update to said Domain Name System server.

11. The messaging server of claim 8, wherein said delivering element is adapted, when executed by the processor, to:
    use one of the protocols SMTP, LMTP, HTTP, SIP, MMS or SMS or any method within OMA Push during said step of delivering said electronic state message to said at least one IMAP terminal.

12. The messaging server of claim 8, wherein said delivering element is adapted, when executed by the processor, to:
    deliver said electronic state message to said at least one IMAP terminal via at least one NAT node whereby a second messaging server is connected to said NAT node.

13. The messaging server of claim 12, wherein said delivering element is adapted, when executed by the processor, to:
    deliver said electronic state message to said at least one IMAP terminal via aid second messaging server.

14. The messaging server of claim 8, wherein said at least one IMAP terminal is a mobile terminal.

* * * * *

UNITED STATES PATENT AND TRADEMARK OFFICE
CERTIFICATE OF CORRECTION

| | | |
|---|---|---|
| PATENT NO. | : 8,583,826 B2 | Page 1 of 1 |
| APPLICATION NO. | : 12/515203 | |
| DATED | : November 12, 2013 | |
| INVENTOR(S) | : Eriksson | |

It is certified that error appears in the above-identified patent and that said Letters Patent is hereby corrected as shown below:

On the Title Page, item (75), under "Inventor", in Column 1, Line 1,
delete "Linkoping" and insert -- Linköping --, therefor.

On the Title Page, item (56), under "OTHER PUBLICATIONS", in Column 2, Line 5,
delete "2006)" and insert -- 2006, --, therefor.

In the Specification

In Column 6, Line 39, delete "sever 250" and insert -- server 250 --, therefor.

In Column 6, Line 50, delete "NAP" and insert -- IMAP --, therefor.

In Column 11, Line 50, delete "DynamicONS" and insert -- DynamicDNS --, therefor.

In the Claims

In Column 16, Line 62, in Claim 13, delete "aid" and insert -- said --, therefor.

Signed and Sealed this
Twenty-second Day of April, 2014

Michelle K. Lee
*Deputy Director of the United States Patent and Trademark Office*